Sept. 25, 1945. H. E. BROWN ET AL 2,385,328
ELECTRICALLY VIBRATED FEEDER
Filed June 16, 1943 2 Sheets-Sheet 1

INVENTOR.
HUGH E. BROWN AND
BY STEWART M. GRANT
Fay, Golrick, Chilton & Isler.
ATTORNEYS.

Sept. 25, 1945.   H. E. BROWN ET AL   2,385,328
ELECTRICALLY VIBRATED FEEDER
Filed June 16, 1943    2 Sheets-Sheet 2

INVENTOR.
HUGH E. BROWN AND
BY STEWART M. GRANT.
Fay, Golrick, Chilton & Isler.
ATTORNEYS Patented Sept. 25, 1945

2,385,328

UNITED STATES PATENT OFFICE 2,385,328

ELECTRICALLY VIBRATED FEEDER

Hugh E. Brown, Cleveland Heights, and Stewart M. Grant, Bay Village, Ohio, assignors to The W. S. Tyler Company Application June 16, 1943, Serial No. 491,070

2 Claims. (Cl. 198—220)

This invention relates, as indicated, to electrically vibrated feeders, but has reference more particularly to a feeder of this type which has been designed especially for feeding dry granular materials and the like from a hopper into which such materials are initially fed to a screen or screening machine in which the materials are screened or classified.

It has heretofore been proposed to mount a feeder or conveyor on resilient supports, such as inclined leaf springs, secured at one end to a base, and to vibrate the feeder by means of electromagnetic impulses acting directly through the springs.

In such feeders, the rate of feed depends to some extent on the relation between the free vibration period of the springs and the recurrence period of the current impulses, so that in order to adjust the rate of feed, the free vibration period of the springs requires to be adjusted, as by increasing or decreasing the stiffness of the springs or by replacement of the springs by others of greater or lesser stiffness.

The present invention has as its primary object the provision of a feeder of this type in which variation in the extent or rate of feed may be accomplished over a relatively wide range by merely increasing the number of current impulses, and without requiring adjustment of the supporting springs.

Another object of the invention is to provide a feeder of the type described, in which the rate of feed may be increased over a relatively wide range without substantial increase in the degree or extent of vibration imparted by the feeder through the springs to the supporting base or plate, so that the feeder, throughout its range of operation, is free from the noise and base vibration which characterize other feeders now available in the market.

A further object of the invention is to provide a feeder of the character described which is of relatively simple but rugged construction, and which may be expected to operate throughout relatively long periods without requiring repair or reconstruction.

A still further object of the invention is to provide an electromagnetic motor or vibrator of novel construction, which is relatively quiet in operation, and well-adapted for the vibration of feeders of this type.

Other objects and advantages of the invention will be apparent during the course of the following description.

In the accompanying drawings, forming a part of this specification, and in which like numerals are employed to designate like parts throughout the same, Fig. 1 is a side elevational view of a feeder embodying the principal features of the invention, and illustrating, more or less diagrammatically, one of the principal uses of the feeder;

Fig. 6 is an electrical wiring diagram, illustrating a simple circuit for imparting unidirectional current impulses to the magnet of the feeder which has been described.

Figure 1:
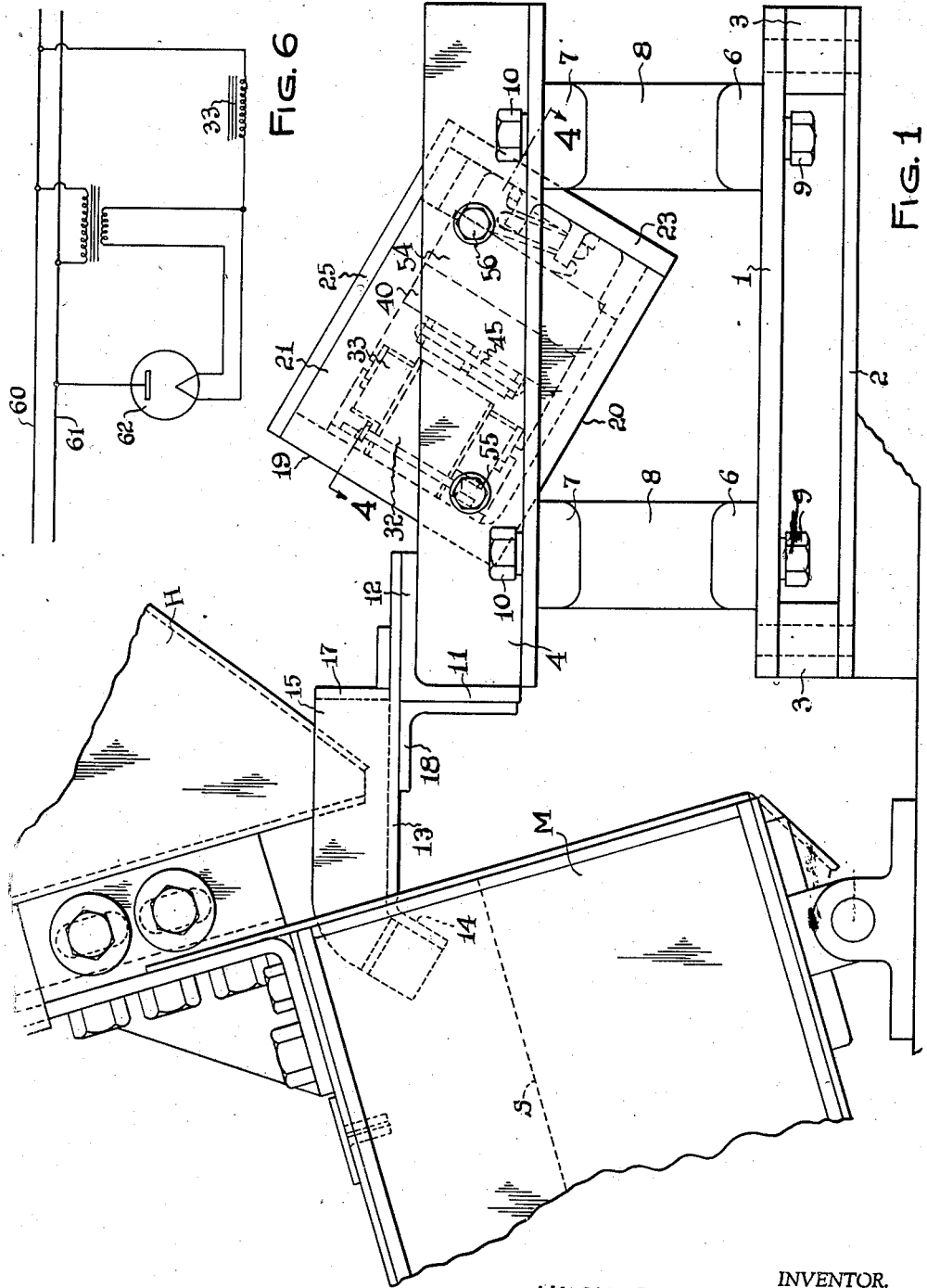
Figure 2:
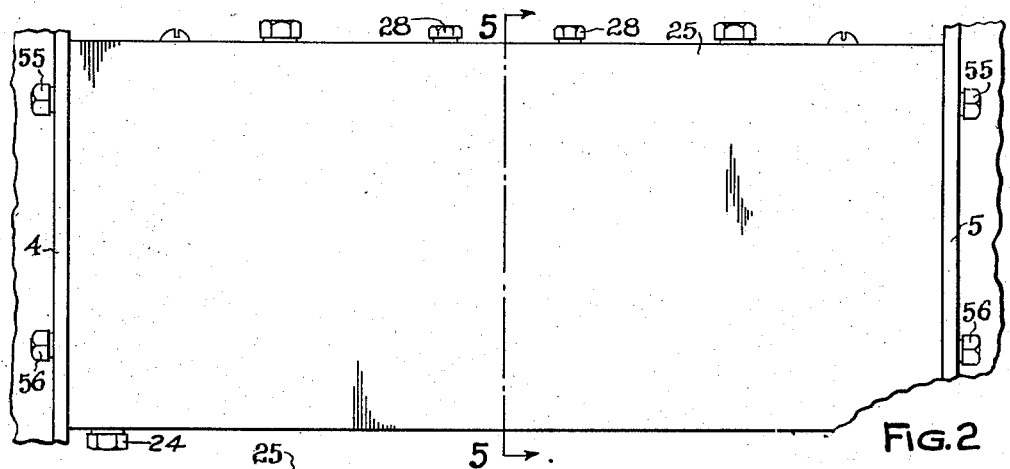
Fig. 2 is a plan view of the electromagnetic motor.
Figure 3:
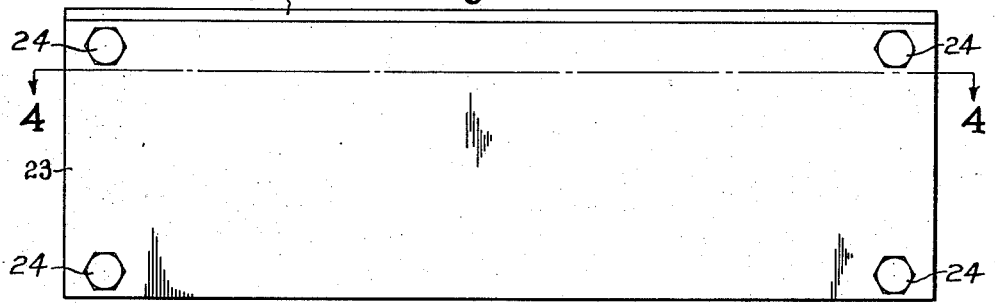
Fig. 3 is a rear elevational view of the electromagnetic motor.
Figure 4:
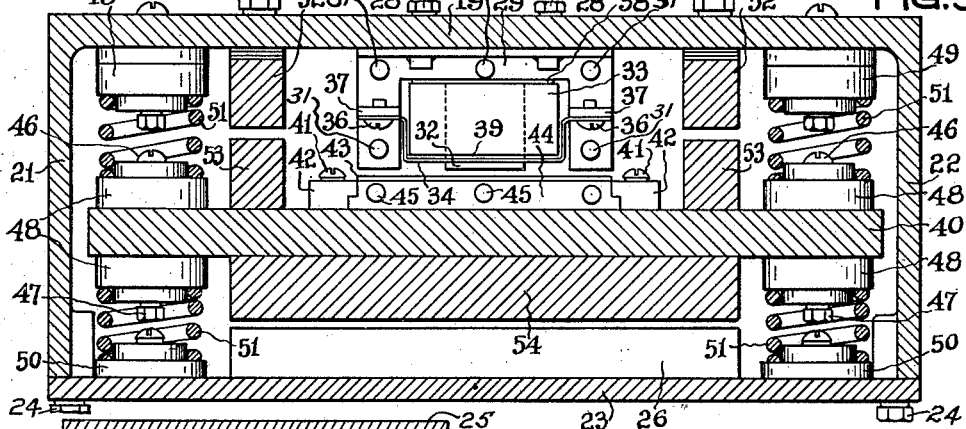
Fig. 4 is a cross-sectional view of the motor, taken on the line 4—4 of Figs. 1 and 3.
Figure 5:
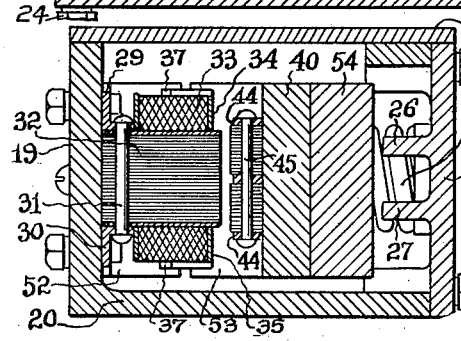
Fig. 5 is a cross-sectional view of the motor, taken on the line 5—5 of Fig. 2.

Referring more particularly to the drawings, it will be seen that the feeder comprises a base consisting of vertically spaced plates 1 and 2, separated from each other by means of spacer blocks 3, this base being adapted for rigid securement to a floor, table, platform, or other suitable support.

Disposed above the aforesaid base, in spaced relation to the latter, is a motor and feed-plate supporting frame consisting of a pair of laterally spaced angles 4 and 5, which are resiliently mounted upon the base by means of units consisting of spaced metallic elements 6 and 7, and blocks 8 of rubber interposed therebetween and preferably vulcanized to said elements. The elements 6 and 7 are provided with threaded holes, whereby they may be respectively secured to the plates 1 and angles 4 and 5, by means of cap screws 9 and 10. The rubber blocks 8 are of a stiffness which will readily permit vibration of the angles 4 and 5.

Instead of using rubber mountings, as described, other forms and types of resilient supports may be used, as for example, coil springs.

Secured as by welding to the front ends of the angles 4 and 5 is an angle 11, having a horizontally disposed flange 12 which serves to support a feed plate 13, having at its forward end a downturned flange or lip 14, over which the materials to be fed fall, such material being confined against lateral displacement from the feed plate by means of side plates 15 and 16, and against displacement rearwardly from the feed plate by means of a plate 17 forming the rear wall of the feeder. The feed plate may be further supported by means of an angle 18, which is secured to the angle 11.

The vertical flanges of the angles 4 and 5 serve as supports for an electromagnetic motor or vibrator which comprises a box or casing consisting of a portion having a front 19, a bottom 20, and end walls 21 and 22, a rear closure 23, adapted to be secured, as by screws 24, to the aforesaid end walls, and a cover or lid 25, which is removably secured to the box.

The rear closure 23 is provided with a pair of longitudinally extending flanges 26 and 27, which are parallel with each other, terminate short of the end walls 21 and 22, and serve as stiffening members.

Secured to the front 19 of the vibrator box, as by means of screws 28, are a pair of relatively short U-shaped metallic members 29 and 30, to which is secured, as by means of rivets 31, a laminated core 32 consisting of soft iron E-shaped plates, the core being interposed between the members 29 and 30. A coil 33 of wire surrounds the middle leg of the magnet core 32, and is secured against endwise displacement from this leg by means of U-shaped metallic straps or bands 34 and 35, the ends of which are secured, as by means of screws 36 to metallic pieces 37 which extend from and are welded to the arms of the metallic members 29 and 30. Strips 38 of fiber or like material are preferably interposed between the coil 33 and the members 29 and 30, and similar strips 39 are preferably interposed between the coil 33 and the metallic straps 34 and 35.

Extending longitudinally of the vibrator casing, in spaced relation to the magnet core, is an armature 40 in the form of a relatively heavy bar or plate, to which are secured, as by screws 41, L-shaped elements 42, which serve to secure to the plate 40 the soft iron laminations 43 of the armature, these laminations being secured in assembled relation by means of metallic retainer plates 44 and rivets 45.

The ends of the bar or plate 40 have secured thereto, as by means of bolts 46 and nuts 47, spring retainer elements 48, between which and similar elements 49 and 50, secured respectively to the front 19 and rear closure 23 of the vibrator box, are interposed compression coil springs 51, the armature being thus floatingly mounted in the box between opposed pairs of springs.

Disposed within the box, between the springs 51 and the magnet coil, are pairs of striking blocks, one block 52 of each pair being secured to the front 19 of the box and the other block 53 of each pair being secured to the armature plate 40.

The plate 40 is also provided with a weight 54, which increases the effectiveness of the vibration.

The electromagnetic vibrator is mounted on the angles in an inclined position, as shown in Fig. 1, by means of bolts 55 and 56, the vibrator being so mounted that gravity assists the return of the armature to its normal or intermediate position.

The operation of feeder will be readily understood from the foregoing description, but may be briefly described as follows:

Alternating current of ordinary commercial voltage and amperage, supplied by the power lines 60 and 61 (Fig. 6) is converted into unidirectional current impulses by means of a rectifier tube 62, and these impulses are transmitted to the coil 33 of the electromagnet. With each impulse, the armature of the electromagnetic vibrator is pulled towards the coil, and upon the cessation of the impulse, the armature is restored to its normal position by means of the compressed springs 51, which are disposed between the elements 48 and 49.

This vibration of the armature and its associated elements is sufficient to impart a corresponding vibration to the angles 4 and 5, and in turn, to the feed plate, so as to impart a feeding movement to dry or granular materials deposited thereon, such material eventually falling over the lip 14 of the feed plate. This vibratory movement is readily permitted by the resilient mountings of the electromagnetic motor.

The aforesaid feeding action occurs even if the blocks 53 on the armature plate do not come into contact with the blocks 52 on the box, but is augmented to some extent if such blocks are permitted to come into contact with each other. Such contact, however, produces some noise which may be objectionable.

Referring to Fig. 1, a typical use of the feeder involves feeding of materials from a hopper into which such materials are initially fed onto a screen on which the materials are to be screened. The rear end of the feed plate in such case is disposed beneath the spout of a feed hopper H, which is secured to one end of a screening machine M, having a screen S, which may be an electromagnetically vibrated screen. The front end of the feed plate extends through an opening in one end of the screening machine, but is not permitted to come into contact with any part of the screening machine during vibration of the feed plate. As the feed plate is vibrated, materials discharged thereon from the hopper H, are carried along the feed plate and discharged over the lip 14 of the plate, and onto the upper end of the screen S, the screening machine being preferably mounted in an inclined position to facilitate the distribution of the materials to be screened as well as to increase the efficiency of the screening action. The inclination of the screening machine to the feed plate may be adjusted within predetermined limits.

The extent or rate of feed may be varied over a relatively wide range without adjusting or replacing the resilient supports, and without substantially increasing the degree or extent of vibration imparted by the feeder through the resilient supports to the supporting base.

The feeder, moreover, is characterized by freedom from substantial noise and vibration throughout its range of operation, and its simplicity and ruggedness of construction.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a feeder of the character described, a base, a frame comprising a pair of spaced angles having horizontal and vertical flanges, resilient means interposed between said base and said horizontal flanges, and an electromagnetic vibrator extending between and rigidly secured to said vertical flanges, said vibrator being so mounted that the plane of vibration thereof is angular to the plane of said horizontal flanges.

2. In a feeder of the character described, a base, a frame comprising a pair of spaced angles having horizontal and vertical flanges, resilient means interposed between said base and horizontal flanges, an electromagnetic vibrator extending between and secured to said vertical flanges, said vibrator being mounted at an angle such that the plane of vibration thereof is angular to the common plane of said horizontal flanges, and a feed plate supported by said angles adjacent one end of the angles, said feed plate having at least a portion thereof substantially parallel with said horizontal flanges.

HUGH E. BROWN.
STEWART M. GRANT.